(No Model.)
J. A. CHAPMAN.
VEHICLE SHAFT COUPLING.
No. 409,732. Patented Aug. 27, 1889.
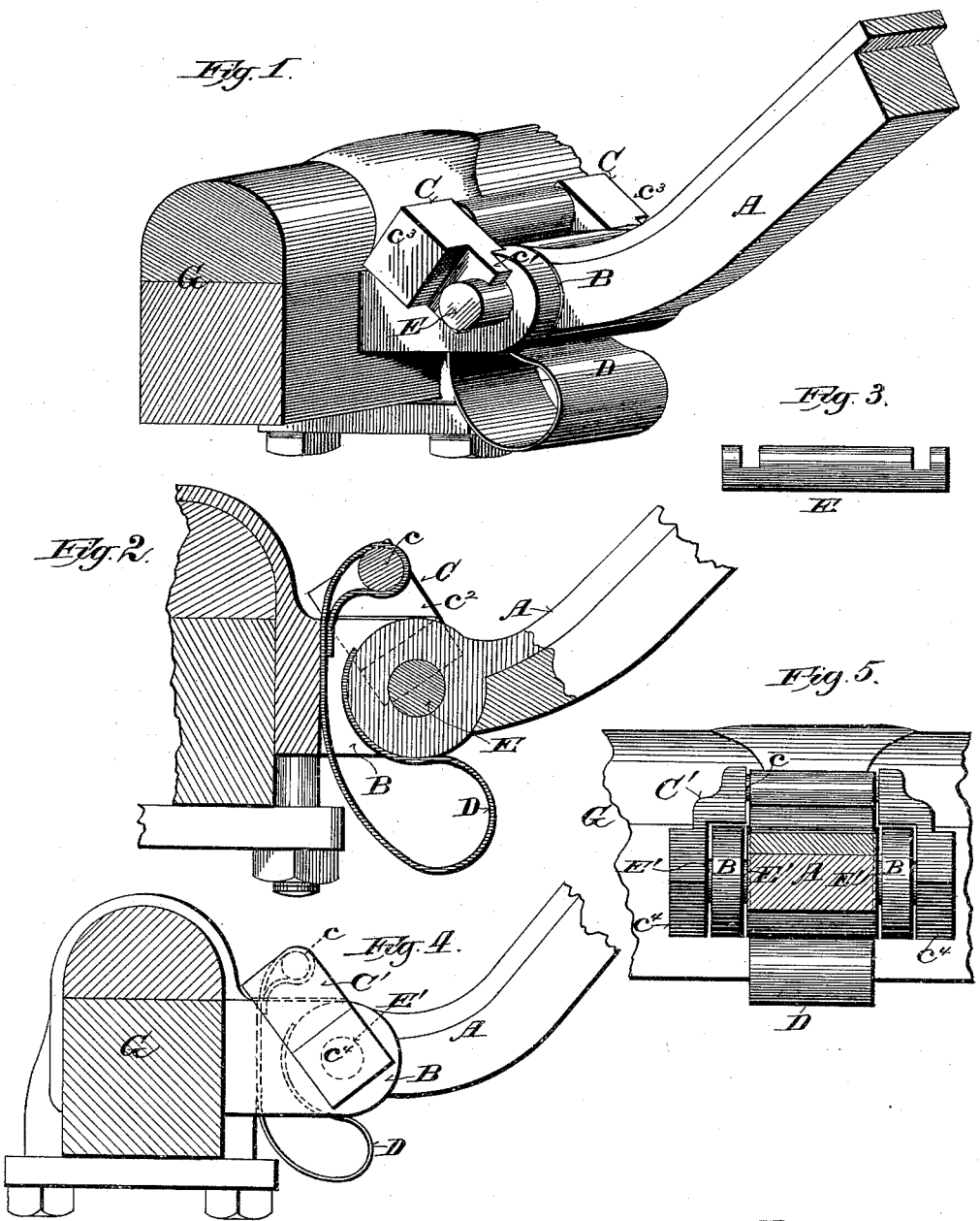
Witnesses:
E. L. Amus
Chas. L. Goss
Inventor:
John A. Chapman,
By
Alexander Hayden Smith & Otterwether
Attorneys.

UNITED STATES PATENT OFFICE.

JOHN ALBERT CHAPMAN, OF MILWAUKEE, WISCONSIN.

VEHICLE-SHAFT COUPLING.

SPECIFICATION forming part of Letters Patent No. 409,732, dated August 27, 1889.

Application filed March 8, 1889. Serial No. 302,562. (No model.)

*To all whom it may concern:*

Be it known that I, JOHN ALBERT CHAPMAN, of Milwaukee, in the county of Milwaukee and State of Wisconsin, have invented certain new and useful Improvements in Shaft-Couplings; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The main objects of my invention are to facilitate shifting from shafts to pole, or vice versa, to prevent rattling, to attain greater security, &c.

It consists, essentially, of a spring-loop interposed between the shaft or pole-eye and the ears to which it is coupled, a pin passing through the said eye and ears, and a yoke resting upon said ears, supporting said spring-loop and holding said pin in place.

In the accompanying drawings like letters designate the same parts in the several figures.

Figure 1 is a perspective view of a pole or shaft coupling to which my improvements are applied. Fig. 2 is a partial vertical section of the same, taken transversely to the axle. Fig. 3 is a detached view of the pin. Figs. 4 and 5 are respectively a side and a front elevation, partly in section, illustrating a slight modification in my improved device.

G represents a portion of a vehicle-axle, provided with a clip having the usual coupling-ears B B for the attachment of pole or shafts.

A represents a pole or shaft eye of the ordinary form, adapted to be inserted between the ears B B, and secured thereto by a pin E passing through the same.

C represents a yoke consisting of a cross-bar $c$ and at the ends of said cross-bar of right-angled projections $c'$, which overhang the ears B B close to their outer faces and are adapted to engage notches in the ends of the pin E close to the outer faces of the ears B B, and thereby securely hold said pin in place. D is a spring-loop bent at one end around the cross-bar $c$ of said yoke, extending downwardly therefrom when in position, curved upwardly at the lower end around and back of the eye A, against which it bears, and bearing at the back against that part of the coupling or axle between the ears B B.

The yoke upon which the spring-loop D is suspended is formed on the inside of the end projections $c'$ $c'$ with oblique shoulders $c^2$ $c^2$, which rest, as shown in Fig. 2, on the upper edge of the ears B B, and the downward pull of said spring-loop retains said yoke upon its seats on the upper edges of said ears and prevents the projections $c'$ $c'$ from being disengaged from the notches in the pin E.

At the ends the yoke C is formed with squared wrench-heads $c^3$, by means of which the projections $c'$ $c'$ are turned upwardly out of the notches in said pin E for the purpose of removing the eye A and shifting the shafts or pole.

The insertion of the eye A in place between the ears B B against the upwardly-curved end of the spring-loop D strains the latter and causes it to take up all play between the pin E and the eye and ears through which it passes, and thereby prevents wear and rattling.

The pressure of the eye against the spring-loop D also draws and holds the shoulders $c^2$ on yoke C snugly against their seats on the upper edges of the ears B B.

In shifting, to remove the eye A from the ears, a wrench is applied to one of the squared heads $c^3$ and the yoke is turned so as to lift the projections $c'$ out of the notches in the pin E. In this operation the yoke fulcrums at the rear ends of its shoulders $c^2$ upon the ears B B, and the cross-bar $c$, first rising against the force of the spring-loop, approaches the upper edges of said ears B as the projections $c'$ are brought to an upright position, thereby allowing said spring-loop to descend and relieving the eye A of its pressure.

Referring to Figs. 4 and 5, in place of the notched pin E, hereinbefore described, a plain pin E', cut off flush, or nearly so, with the outer faces of the ears B B, is employed, and the end projections $c^4$ on the yoke C' are extended to project over and cover the ends of said pin.

My improvements may be applied to ordinary shaft or pole couplings without change, and when so applied render the coupling more safe and secure and greatly facilitate the operation of changing.

By these improvements, consisting of the three simple parts hereinbefore described, rubbers, which soon deteriorate, and threaded bolts with nuts, which are unsafe, inconvenient in shifting, and more liable to work loose and rattle, are dispensed with.

I claim—

1. The combination, in a pole or shaft coupling, with the eye and ears, of a pin passing through and connecting them, a yoke provided with projections which are adapted to overhang the coupling-ears and retain the pin therein, and a metallic spring-loop loosely suspended upon said yoke and adapted to bear against the eye of the coupling, said yoke being provided with shoulders which are seated upon said ears and serve, when it is turned into place, to force said spring-loop against said eye, substantially as and for the purposes set forth.

2. The combination, with the eye and ears of a pole or shaft coupling, of a pin passing through and connecting the same and provided at the ends with notches, a yoke seated upon said ears and provided with projections which engage the notches in said pin and hold the same in place, and a metallic spring-loop loosely suspended on said yoke and adapted to bear against said eye, said yoke being provided with shoulders which are seated upon said ears and serve as an eccentric to force said spring-loop against said eye, substantially as and for the purposes set forth.

3. The combination, with the eye and ears of a pole or shaft coupling, of a pin passing through and connecting the same, a yoke consisting of a cross-bar and end projections extending over the perforations in said ears, so as to retain the pin therein, and provided with oblique shoulders which are seated upon the upper edges of said ears, and a metallic spring-loop loosely suspended at the upper end on said cross-bar and adapted to bear at the other end against said eye, said yoke serving, when turned into place, to force said spring-loop against said eye, substantially as and for the purposes set forth.

4. The combination, with the eye and ears of a pole or shaft coupling, of a pin passing through and connecting the same, a yoke consisting of a cross-bar and end projections which have oblique shoulders adapted to rest upon the upper edges of the ears and extend when in position over the perforations in said ears, so as to retain said pin therein, said yoke being provided with a squared head for turning said projections into and out of range with said pin and for forcing the spring-loop against the eye of the coupling, and a metallic spring-loop loosely suspended upon said yoke and adapted to bear against said eye, said yoke serving, when turned into and out of position, to strain and loosen said spring-loop against said eye, substantially as and for the purposes set forth.

In testimony that I claim the foregoing as my own I affix my signature in presence of two witnesses.

JOHN ALBERT CHAPMAN.

Witnesses:
CHAS. L. GOSS,
FRANK R. HIBBARD.